United States Patent [19]

Wachi

[11] Patent Number: 5,471,447
[45] Date of Patent: Nov. 28, 1995

[54] SEEK CONTROL FOR INFORMATION STORAGE DISC DRIVE

[75] Inventor: Shigeaki Wachi, Tokyo, Japan

[73] Assignee: Sony Corporation, Tokyo, Japan

[21] Appl. No.: 744,966

[22] Filed: Aug. 14, 1991

[30] Foreign Application Priority Data

Sep. 13, 1990 [JP] Japan .................................. 2-243469

[51] Int. Cl.[6] .......................... G11B 7/00; G11B 21/10; G11B 5/596
[52] U.S. Cl. ...................... 369/44.28; 369/32; 360/78.04
[58] Field of Search .................................. 369/32, 44.27, 369/44.28, 44.11, 44.12; 360/77.02, 73.03, 78.04–78.14

[56] References Cited

U.S. PATENT DOCUMENTS

| | | | |
|---|---|---|---|
| 3,775,655 | 11/1973 | Du Vall | 360/77.02 |
| 4,697,127 | 9/1987 | Stich et al. | 360/78.06 |
| 4,745,588 | 5/1988 | Yoshikawa et al. | 369/32 |
| 4,748,607 | 5/1988 | Nakane | 369/32 |
| 4,785,439 | 11/1988 | Okada et al. | 369/32 |
| 4,837,757 | 6/1989 | Okada et al. | 369/32 |
| 4,937,803 | 6/1990 | Nakane | 369/32 |
| 5,036,506 | 6/1991 | Bierhoff | 369/44.27 |

FOREIGN PATENT DOCUMENTS

| | | | |
|---|---|---|---|
| 277799 | 8/1988 | European Pat. Off. | 369/44.27 |
| 0294545 | 12/1988 | European Pat. Off. | 369/44.27 |
| 60-74128 | 4/1985 | Japan | 369/44.14 |
| 62-54833 | 3/1987 | Japan | 369/44.27 |

Primary Examiner—Jeffery Brier
Assistant Examiner—Thai Tran
Attorney, Agent, or Firm—Limbach & Limbach

[57] ABSTRACT

An optical pickup is controlled to move to a target track on an optical information storage disc based on target value information representing the sum of speed information indicative of a speed at which the optical pickup is to move, and distance information indicative of a distance which the optical pickup has moved toward the target track. A first subtractor produces a differential signal indicative of the difference between the target value information and remaining distance information which represents a remaining distance that the optical pickup is to move. The differential signal is supplied to a second subtractor which determines the difference between the differential signal and actual speed information indicating an actual speed at which the optical pick is moving. The second subtractor produces a differential signal which is supplied to an actuator to move the optical head.

4 Claims, 4 Drawing Sheets

Acceleration

Speed

Distance

Speed

Distance

Sum

SEEK CONTROL FOR INFORMATION STORAGE DISC DRIVE

BACKGROUND OF THE INVENTION

1. Field of the Invention

The present invention relates to a seek control system for controlling a pickup or read/write head to move to a desired target track on an information storage disc such as a magnetic disc, an optical disc, a magneto-optical disc, or the like.

2. Description of the Prior Art

One known optical disc recording/reproducing apparatus has an optical pickup movable radially over an optical disc under seek control, as disclosed in Japanese Patent Application No. 1-312940. When the optical pickup is to move to a desired target track on the optical disc, the square root of the distance from the present track to a target track is used as a target value, and the difference between the target value and the speed at which the optical pickup is moved by a pickup actuator is detected. The optical pickup is moved to the target track based on the detected difference.

FIGS. 1 and 2 show conventional seek control systems for use in the optical disc recording/reproducing apparatus. FIG. 1 shows a control circuit arrangement for moving an optical pickup by a distance xo which is half a distance 2xo from a starting position to a desired target track. The control circuit arrangement shown in FIG. 1 includes a calculating circuit 1 for calculating the square root $\sqrt{x}$ of a distance x that the optical pickup has moved toward the target track. The output signal from the calculating circuit 1 is supplied to a multiplier 2 which multiplies the square root $\sqrt{x}$ by a coefficient $\sqrt{2|\alpha|}$ supplied from a coefficient generator 3. $|\alpha|$ in the coefficient $\sqrt{2|\alpha|}$ represents the absolute value of an acceleration $\alpha$ of the moving optical pickup. The output signal from the multiplier 2 is supplied to a noninverting input terminal of an operational amplifier 4 which serves as a comparator. The operational amplifier 4 has an inverting input terminal that is supplied with a speed $\dot{x}$ of the moving optical pickup, as detected by a speed detector 5. The operational amplifier 4 determines the difference between the output signal from the multiplier 2 and the speed $\dot{x}$ of the optical pickup. The operational amplifier 4 applies an output signal to an actuator 6, which then moves the optical pickup based on the applied output signal.

FIG. 2 shows a control circuit arrangement for controlling an optical pickup when the remaining distance to a target track becomes half a distance from a starting position to the target track. The control circuit arrangement shown in FIG. 2 includes a calculating circuit 1' for calculating the square root $\sqrt{2xo-x}$ of the difference between a distance 2xo from an original position to a desired target track and a distance x that the optical pickup has moved toward the target track. The output signal from the calculating circuit 1' is supplied to a multiplier 2 which multiplies the square root $\sqrt{2xo-x}$ by a coefficient $\sqrt{2|\alpha|}$ supplied from a coefficient generator 3. The output signal from the multiplier 2 is supplied to a noninverting input terminal of an operational amplifier 4. The operational amplifier 4 determines the difference between the output signal from the multiplier 2 and a speed $\dot{x}$ of the optical pickup, as detected by a speed detector 5. The operational amplifier 4 applies an output signal to an actuator 6, which then moves the optical pickup based on the applied output signal.

The number of tracks traversed by the optical pickup is used to detect when the remaining distance to the target track becomes half the distance from the starting position to the target track.

A seek control process for the optical pickup is carried out as shown in FIGS. 3A, 3B, and 3C, using the control circuit arrangements shown in FIGS. 1 and 2. FIGS. 3A, 3B, and 3C show, respectively, the acceleration and speed of the optical pickup and the distance traversed by the optical pickup, as they vary with a time T in which the optical pickup moves to the target track. Before the distance traversed by the optical pickup becomes half the distance from the starting position to the target track, the speed of the optical pickup increases with a constant acceleration $\alpha$, and when the distance traversed by the optical pickup exceeds half the distance from the starting position to the target track, the speed of the optical pickup decreases with an inverted acceleration (deceleration) $-\alpha$, as shown in FIG. 3A. The optical pickup stops when it reaches the target track. As shown in FIG. 3B, the speed $\alpha t$ of the optical pickup increases until the distance traversed by the optical pickup becomes half the distance from the starting position to the target track, and decreases when the distance traversed by the optical pickup exceeds half the distance from the starting position to the target track. As shown in FIG. 3C, the distance $(1/2)\cdot\alpha t^2$ traversed by the optical pickup until the time T elapses varies in a substantially S-shaped pattern. That is, the distance traversed by the optical pickup increases at a maximum rate when the the distance traversed by the optical pickup becomes half the distance from the starting position to the target track, and at a very small rate immediately before the optical pickup reaches the target track.

The above seek control process enables the optical pickup to move to the target track within a short period of time, and hence at a high speed.

With the conventional seek control process, as the optical pickup approaches the target track, the speed thereof is gradually lowered, and when the optical pickup arrives at the target track, the speed thereof becomes zero. Immediately before the optical pickup reaches the target track, the speed thereof is very low, making it difficult to stop the pickup exactly on the target track. More specifically, the speed of the optical pickup may actually become zero immediately before the optical pickup reaches the target track. In such a case, the optical pickup stops when its speed becomes zero, and is positioned off the target track.

The processes for calculating the square roots $\sqrt{x}$, $\sqrt{2xo-x}$ with the calculating circuits 1, 1' are very complex and time-consuming, and therefore pose a large burden on the calculating circuits 1, 1'.

OBJECTS AND SUMMARY OF THE INVENTION

It is an object of the present invention to provide a seek control system which is of a simple circuit arrangement for moving a pickup or read/write head accurately at high speed to a desired target track on an information storage disc.

According to the present invention, there is provided a seek control system for controlling a read/write head to move to a target track on an information storage disc, comprising means for generating target value information representing the sum of speed information indicative of a speed at which the read/write head is to move, and distance information indicative of a distance which the read/write head has moved toward a target track on an information storage disc, and means for moving the read/write head based on the generated sum of speed information and distance information.

When the read/write head reaches the target track, it has been moving at a certain speed based on the speed information, and can stop accurately on the target track. Since the read/write head is prevented from stopping before it arrives at the target track, the read/write head is controlled accurately under seek control.

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE PREFERRED EMBODIMENT

Figure 1:
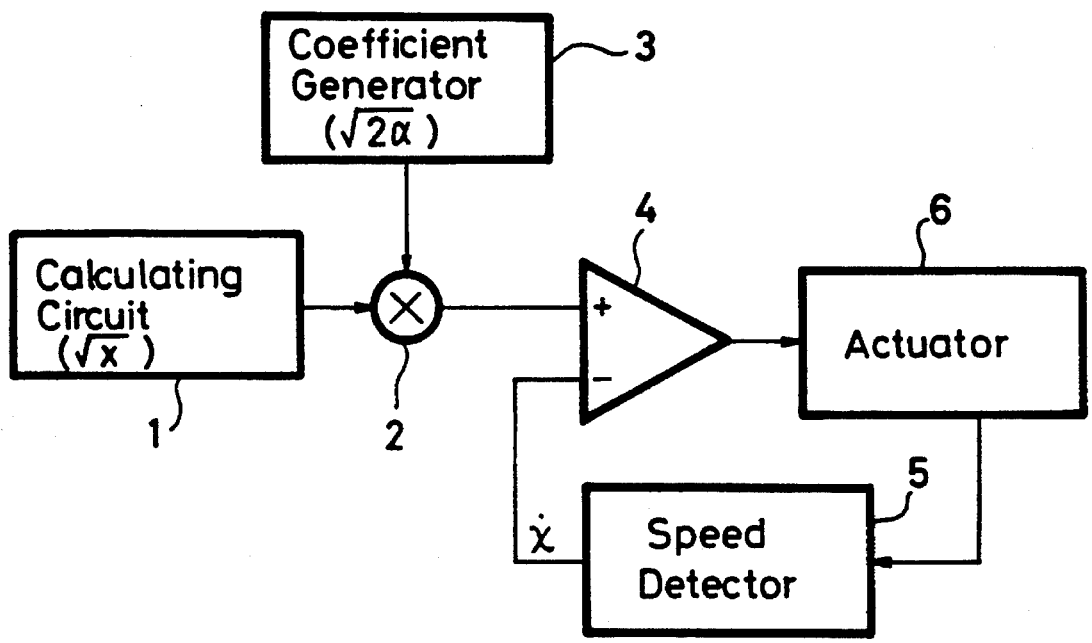
FIGS. 1 and 2 are block diagrams of conventional seek control systems.
Figure 2:
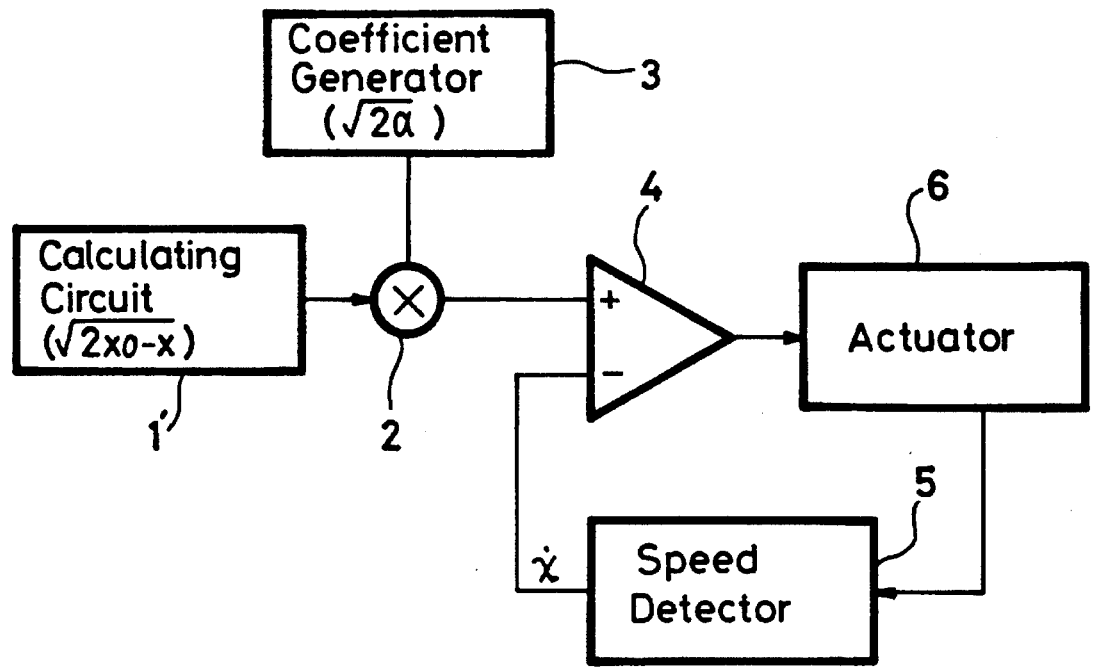
Figure 3A:
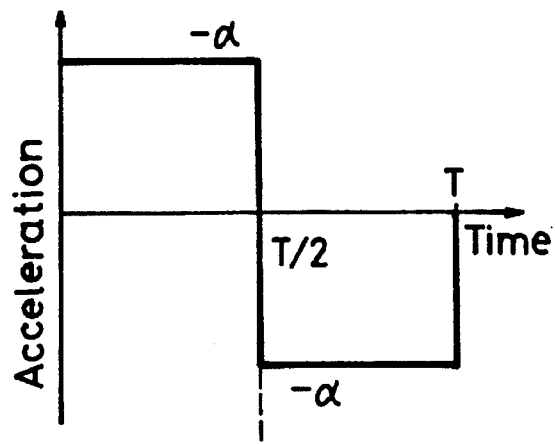
FIGS. 3A through 3C are diagrams showing characteristic curves obtained when an optical pickup is controlled by the seek control systems shown in FIGS. 1 and 2.
Figure 3B:
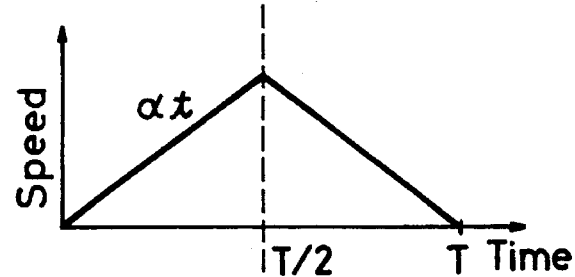
Figure 3C:
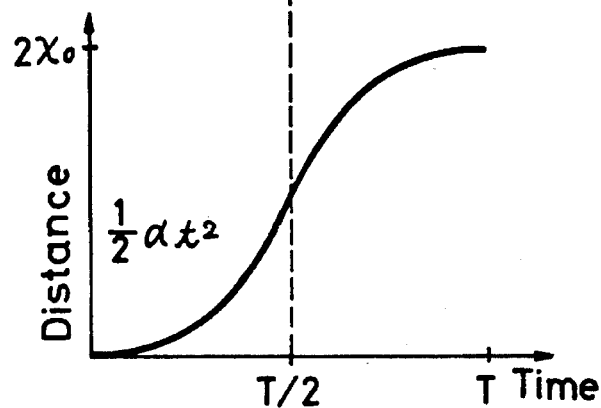
Figure 4:
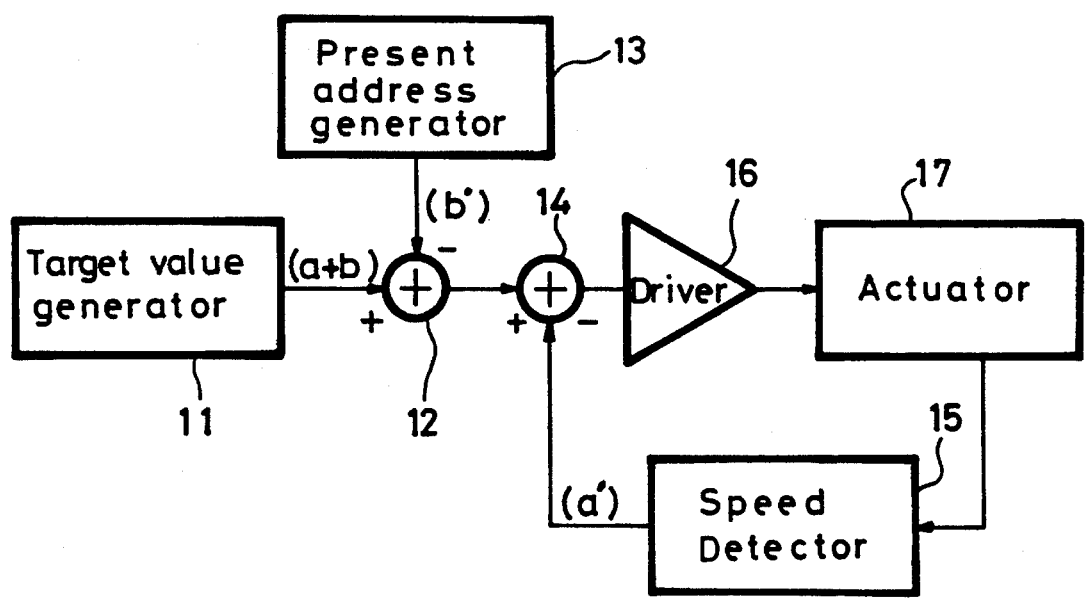
FIG. 4 is a block diagram of a seek control system according to the present invention.

FIG. 4 shows in block form a seek control system according to the present invention, for controlling a read/write head or optical pickup to move to a target track on an information storage disc or optical disc.

Figure 5A:
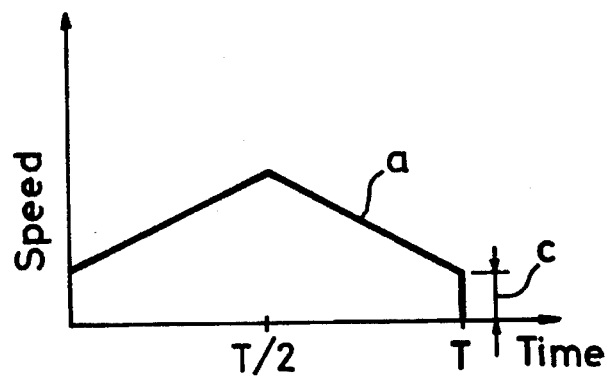
FIGS. 5A through 5C are diagrams showing characteristic curves obtained when an optical pickup is controlled by the seek control system shown in FIG. 4.
Figure 5B:
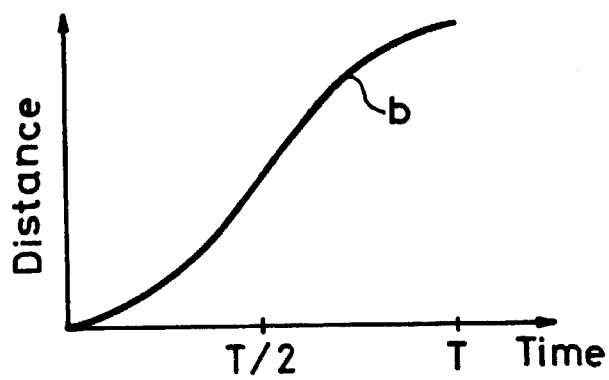
Figure 5C:
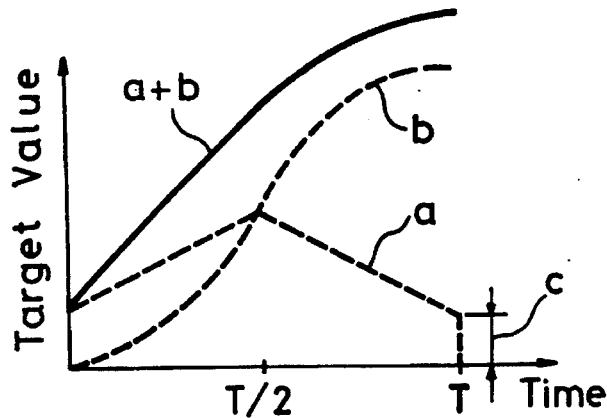

As shown in FIG. 4, the seek control system includes a target value generator 11 for generating as a target value the sum (a+b) of speed information (a) indicative of a speed at which the optical pickup is to move, and distance information (b) indicative of a distance which the optical pickup has moved toward a target track on an optical disc. As shown in FIG. 5A, the speed information (a) represents a speed (c) when a seek control process is started, gradually increases the speed from the speed (c) until an intermediate point in the distance to a target position (target track) is reached by the optical pickup, and then gradually reduces the speed after the intermediate point. The speed information (a) represents the speed (c) again immediately before the optical pickup stops in the target position. As shown in FIG. 5B, the distance information (b) is an integral of the speed information (a). Consequently, as shown in FIG. 5C, the target value information (a+b) is a linear combination of the speed information (a) and the distance information (b), the distance information (b) being lifted by the initial speed (c). As shown in FIG. 4, the target value information (a+b) generated by the target value generator 11 is supplied to a positive input terminal of a first subtractor 12.

The seek control system also includes a present address generator 13 for generating distance information (b') indicative of a remaining distance to the target track, based on detected present positional information representing the present position of the optical pickup. The remaining distance information (b') from the present address generator 13 is supplied to a negative input terminal of the subtractor 12.

The subtractor 12 determines the difference between the target value information (a+b) from the target value generator 11 and the remaining distance information (b') from the present address generator (13). The differential signal from the subtractor 12 is applied to a positive input terminal of a second subtractor 14.

A speed detector 15 detects an actual speed at which the optical pickup is moving, based on information from an actuator 17 which moves the optical pickup. Actual speed information (a') produced by the speed detector 15 is supplied to a negative input terminal of the second subtractor 14.

The second subtractor 14 determines the difference between the differential signal from the first subtractor 12 and the actual speed information (a') from the speed detector 15. The second subtractor 14 applies a differential signal through a driver 16 to the actuator 17, which then moves the optical pickup to the target track.

The speed information (a) and the distance information (b) of the target value information (a+b) generated by the target value generator 11 are indicated by equations as follows:

Until a half T/2 of a time T required for the optical pickup to reach the target track elapses, the speed information (a) is given by:

$$a = kt + c \quad (1),$$

and the distance information (b) is given by:

$$b = (\tfrac{1}{2})kt^2 \quad (2).$$

During the remaining period after the half T/2 of the time has elapsed and until the time T elapses, the speed information (a) is given by:

$$a = k(T/2) + c - k\{t - (T/2)\} \quad (3),$$

and the distance information (b) is given by:

$$b = (\tfrac{1}{2})kt^2 - (\tfrac{1}{2})k(T-t)^2 \quad (4).$$

In the above equations (1) through (4), t represents the time which has elapsed so far after the optical pickup has started moving, and k is a constant coefficient.

Therefore, until the half T/2 of the time T required for the optical pickup to reach the target track elapses, the target value information (a+b) is indicated by:

$$(a+b) = kt + c + (\tfrac{1}{2})kt^2 \quad (5).$$

During the remaining period after the half T/2 of the time has elapsed and until the time T elapses, the target value information (a+b) is indicated by:

$$(a+b) = k(T/2) + c - k\{t - (T/2)\} + (\tfrac{1}{2})kt^2 - (\tfrac{1}{2})k(T-t)^2 \quad (6).$$

With the seek control system described above, the movement of the optical pickup in the seek control process is carried out in a short period of time because the speed of the optical pickup is increased until it reaches the intermediate point. Since the speed (c) is included in the equations (5) and (6), the optical pickup starts moving at the speed (c) and stops moving when it has moved at the speed (c). Therefore, the optical pickup reaches the target track at the speed (c). Inasmuch as the speed of the optical pickup is not reduced to zero before the target track, the optical pickup can stop accurately on the target track.

The target value generator (11) simply generates the sum of the speed information (a) and the distance information (b), but does not produce the square roots of the speed information (a) and the distance information (b). Accordingly, since the target value generator (11) is not required to carry out complex calculations, the burden on the target value generator (11) is small, and its circuit arrangement is relatively simple.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A seek control system for controlling a read/write head to move to a target track on an information storage disc, comprising:

means for generating a target value signal indicative of a linear combination of a speed value and a distance value, wherein the speed value is indicative of a speed at which the read/write head is to move toward said target track, and the distance value is indicative of a distance through which the read/write head is to move toward said target track; and means for generating a control signal for moving the read/write head in response to the target signal.

2. A seek control system according to claim 1, further including:

a means for generating a distance signal indicative of a remaining distance to the target track, and wherein the means for generating a control signal includes a first subtracting means for subtracting the distance signal indicative of the remaining distance] from said target value signal to generate a difference signal.

3. A seek control system according to claim 2, further including:

means for producing an actual speed signal indicative of an actual speed at which the read/write head is moving, and wherein the means for generating a control signal includes a second subtracting means for subtracting the actual speed signal from the difference signal to generate said control signal.

4. A seek control system according to claim 3, also including: an actuator for actuating the read/write head in response to the control signal.

* * * * *